United States Patent [19]
Geiselman

[11] Patent Number: 5,765,801
[45] Date of Patent: Jun. 16, 1998

[54] J SHAPED STORAGE HOOK

[76] Inventor: Gray David Geiselman, 5412 Sturbridge, Houston, Tex. 77058

[21] Appl. No.: 533,279

[22] Filed: Sep. 25, 1995

[51] Int. Cl.$^6$ .................................................. E05B 73/00
[52] U.S. Cl. ............................... 248/552; 70/18; 70/59; 70/61
[58] Field of Search ............................ 248/552, 551, 248/553, 304, 305, 339; 70/18, 59, 60, 61, 62

[56] References Cited

U.S. PATENT DOCUMENTS

| | | | |
|---|---|---|---|
| 754,483 | 3/1904 | Mustgrove | 248/552 |
| 1,120,542 | 12/1914 | Rogers | 248/553 X |
| 1,377,413 | 5/1921 | Dwelle | 70/18 |
| 4,025,014 | 5/1977 | Larson | 248/552 |
| 4,135,374 | 1/1979 | Goral | 70/18 |
| 4,756,504 | 7/1988 | Chamberlain | 248/552 |

FOREIGN PATENT DOCUMENTS 74801   10/1918   Hungary ............................ 70/18

*Primary Examiner*—Ramon O. Ramirez
*Assistant Examiner*—Stephen S. Wentsler

[57]  ABSTRACT

A J shaped storage hook with locking bar is provided for securing a hung object against unauthorized removal. The device includes a substantially J shaped storage hook formed from a single length of rod stock. On one end of the storage hook is the hook attachment end which is attached to a fixed and secure base through the use of an attachment mechanism. On the other side of the storage hook is the hook head end with a closed eyelet. Across the J shaped storage devise is a locking bar. After the locking bar is placed over the J shaped storage hook, hung objects are secured by placing a padlock through the closed eyelet. The J shaped storage hook, hung object, locking bar, eyebolt and lock itself fit together in a nondetachable, positively locked assembly.

6 Claims, 4 Drawing Sheets

J SHAPED STORAGE HOOK

FIELD OF THE INVENTION

The invention relates in general to hooks used for hanging or storing equipment or merchandise. More specifically, the invention relates to a storage hook with locking bar that prevents the unauthorized removal of merchandise.

BACKGROUND OF THE INVENTION

This invention relates to storage hooks, pegboards, and associated apparatus which is used to prevent unauthorized removal of a hung object.

Prior art efforts to reduce theft from storage hooks, pegboards, and displays have resulted in complicated locking mechanisms which are expensive and cumbersome to manufacture or use. This prior art includes U.S. Pat. No. 5,027,622 which provides a key-operated lock that holds a cover plate in place about a pegboard rod. A key must be carried by the store clerk to unlock the devise. U.S. Pat. No. 3,655,061 provides an anti-theft device for a hook, but it requires a special design for the product packaging, which is undesirably expensive and limits its range of use. U.S. Pat. No. 1,022,980 provides a locking device for use with a clothes hanger, but requires a special key for both opening and closing the device. U.S. Pat. No. 1,206,769 shows another key-operating locking arrangement in which a special key is required for both opening and closing. U.S. Pat. No. 4,025,014 and U.S. Pat. No. 4,025,014 shows a hook with two open eyelets and no locking bar. This is undesirable because an additional cable must be purchased which is often cumbersome and bulky and/or not made of strong material.

The need has therefore been recognized for a new and improved security device for securing hung objects, display merchandise and other products on hooks. The invention must be relatively simple in construction, inexpensive to manufacture and easy to use.

OBJECT AND SUMMARY OF THE INVENTION

When objects are hung for storage on open hooks in unattended places, they are, of course, subject to unauthorized removal. Object that are stored on hooks include bicycles clothes, mechanical tools and other equipment.

It is therefore the general object of the present invention to provide a storage hook with a locking bar which will secure or lock an object hung upon the hook so as to prevent its unauthorized removal.

Another object is to provide a storage hook with a curved locking bar that can be positioned close to the J shaped storage hook to hold down or immobilize hung objects. The storage hook would have a flatter base.

Another object is to provide a storage hook and associated apparatus which will prove to be rugged in use and will provide a long service life.

Another object of the present invention to provide a new and improved security device for reasonably securing personal objects or merchandise products on a hook or pegboard type hook for minimizing pilferage and theft.

Another object is to provide a security device of the type described which employs a relatively few number of parts that can be inexpensively fabricated from steel, metal, synthetic plastic materials or any other appropriate material and which provides a locking bar and lock on the end portion of the hook to secure the object or merchandise products against unauthorized removal.

Other objects and advantages will become apparent upon reading the following detailed description and upon reference to the drawings. Throughout the description, like reference numerals refer to like parts.

DETAILED DESCRIPTION OF THE DRAWINGS

While the invention will be described in connection with a preferred embodiment, it will be understood that it is not intended to limit the invention to this embodiment. On the contrary, it is intended to cover all alternatives, modifications and equivalents as may be included within the spirit and scope of the invention.

Figure 1:
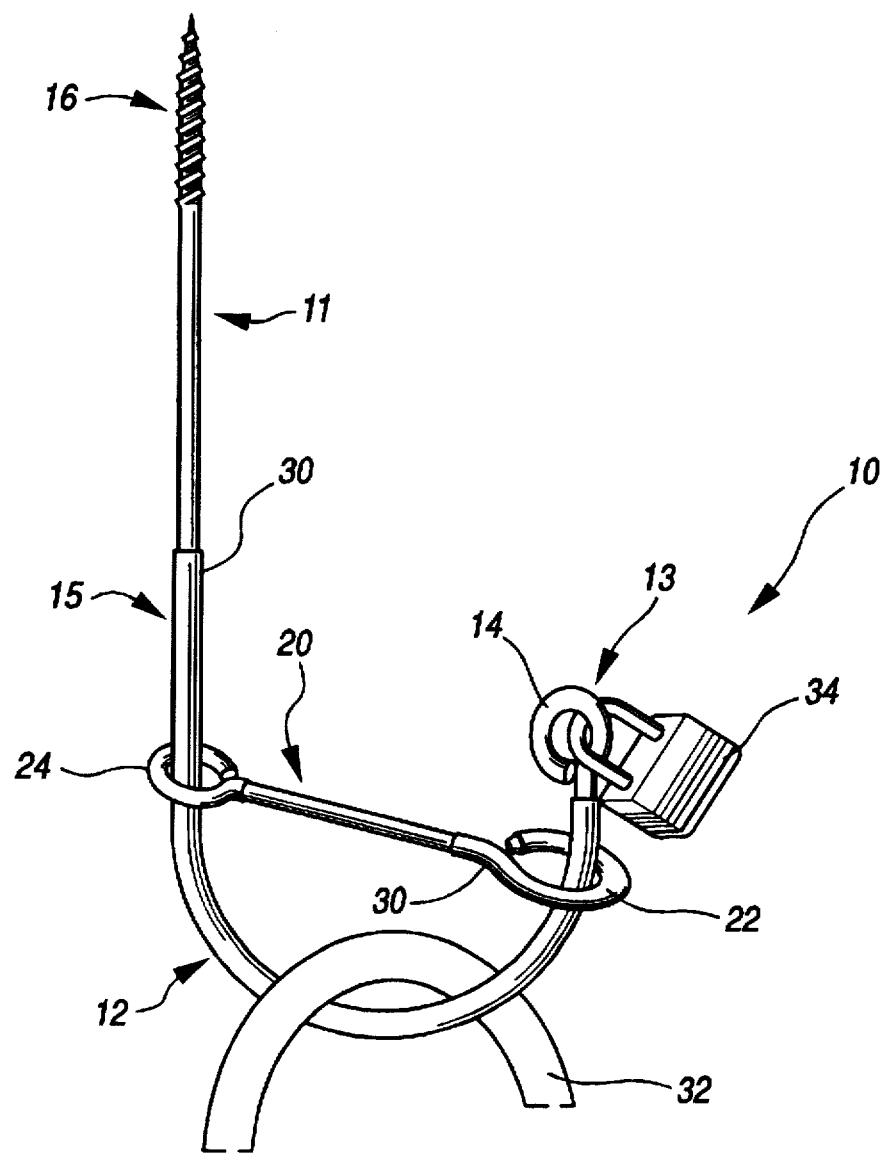
FIG. 1 is a perspective view showing the J shaped storage hook with locking bar and mechanical padlock on the end and associated apparatus as they appear when attached in a manner that prevents unauthorized removal of objects hung on the storage hook.

Turning more specifically to the drawings, there in FIG. 1. is shown a J shaped storage hook 10. For convenience and low manufacturing cost in accordance with the invention, this J shaped storage hook can be formed from a single length of rod, heavy wire stock, hard plastic or any other appropriate material. In shape, the J shaped storage hook includes a substantially straight, rigid leg 11 and a smoothly curved bight 12 lying in a single plane. The bight 12 terminates, at a hook head end 13, in a closed eyelet 14. The closed eyelet 14 lies in a plane generously perpendicular to the plane of the leg 11 and bight 12 to provide a maximum bight opening and proper orientation for other device parts.

At the opposite or hook attachment end 15 of the J shaped storage hook 10, the single length of rod or appropriate material is attached through the use of a pointed and headed cylindrical fastener that is helically or spirally threaded 16 or through the use of any other suitable attachment mechanism.

The attachment mechanism 16 is of sufficient extent to permit the storage hook to be attached in a permanent and secure manner to a fixed support structure.

The locking bar 20 is comprised of a bar with an eyebolt on either end. The front part of the locking bar 20 or front eyelet 22 fits over and is secured snugly below the closed eyelet 14 on the hook head end 13.

The back part of the locking bar 20 or back eyelet 24 fits around or over the hook attachment end 15 of the storage hook below the attachment mechanism 16.

The front eyelet 22 is covered in a rubber coating 30 or other appropriate protective material to prevent rubbing against the hook head end 13. The rubber coating 30 further helps secure or stabilize the locking bar 20 over the J shaped storage hook.

The curved bight may also be covered in rubber coating 30 to prevent scratching or damaging hung objects.

Figure 2:
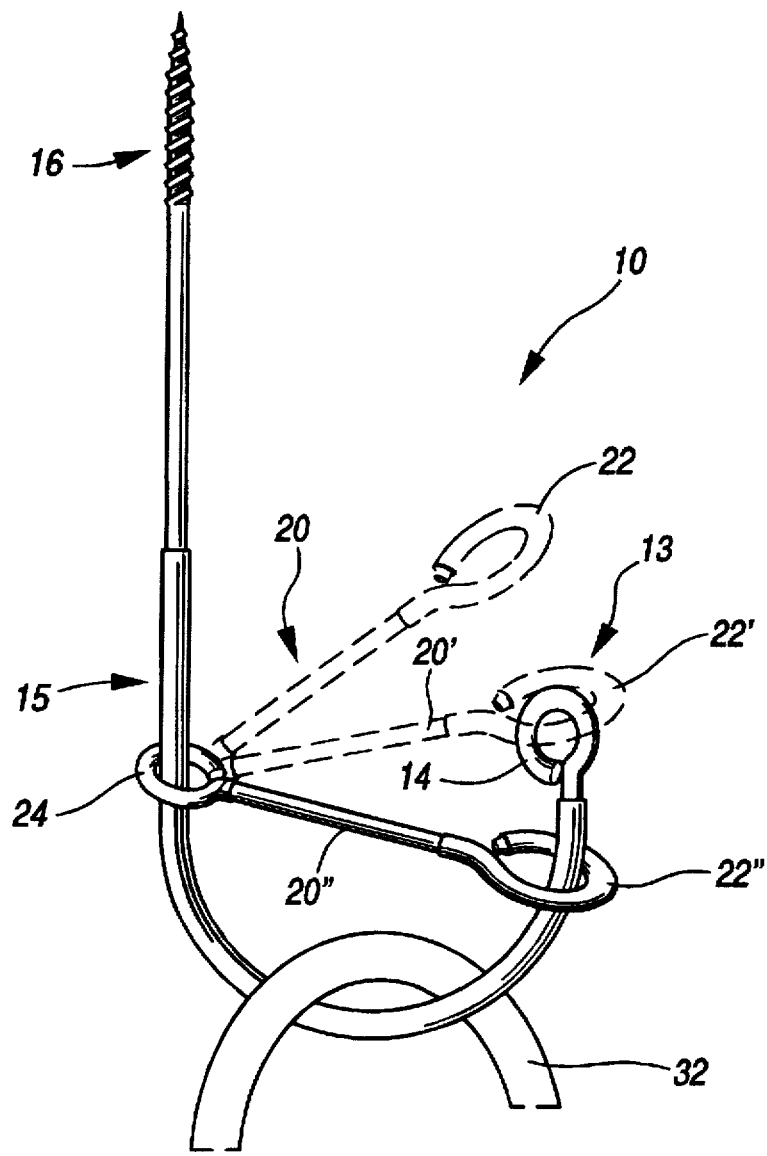
FIG. 2 is a perspective view of J shaped storage hook and locking bar with the locking bar being positioned over the closed eyelet.

As illustrated in FIG. 2. the locking bar 20 will fit over 20, 20', 20" the closed eyelet 14 and by doing so secures the J shaped storage hook 10. The locking bar 20 then fits snugly below the closed eyelet 14 of the hook head end 13 and below the attachment mechanism 16 on the hook attachment end 15.

To secure an object 32 hung upon the J shaped storage hook from unauthorized removal or detachment the back eyelet 24 of the locking bar 20 will slide over the hook attachment end 15. The front eyelet 22, 22', 22" is wide enough to slide over the closed eyelet 14 at the hook head end 13. In carrying out the invention, a locking device such as a padlock 34 can be attached to the closed eyelet 14 at hook head end 13. The front eyelet 22 is not big enough to slide off over the closed eyelet 14 when a padlock is attached. This will positively lock the J shaped storage hook 10 and secure a hung object from unauthorized removal.

Figure 3:
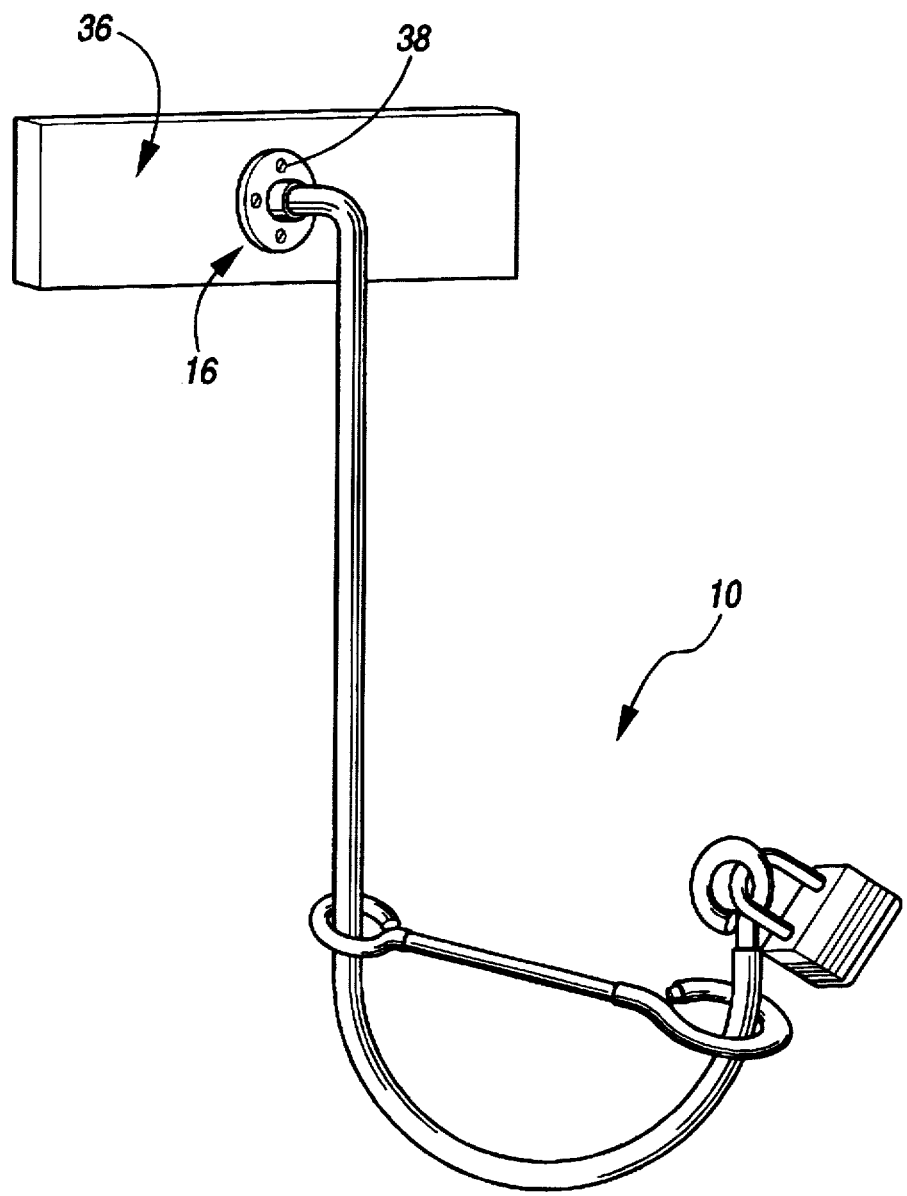
FIG. 3 is a perspective view of the J shaped storage hook with an alternative attachment mechanism.

FIG. 3. is the J shaped storage hook 10 with an attachment mechanism 16 that attaches to a secure base 36 through the use of screw 38 or nails. It is the intention of the invention that the J shaped storage hook be attached to a secure base 36 through the use of any suitable means known to those in the industry.

Figure 4:
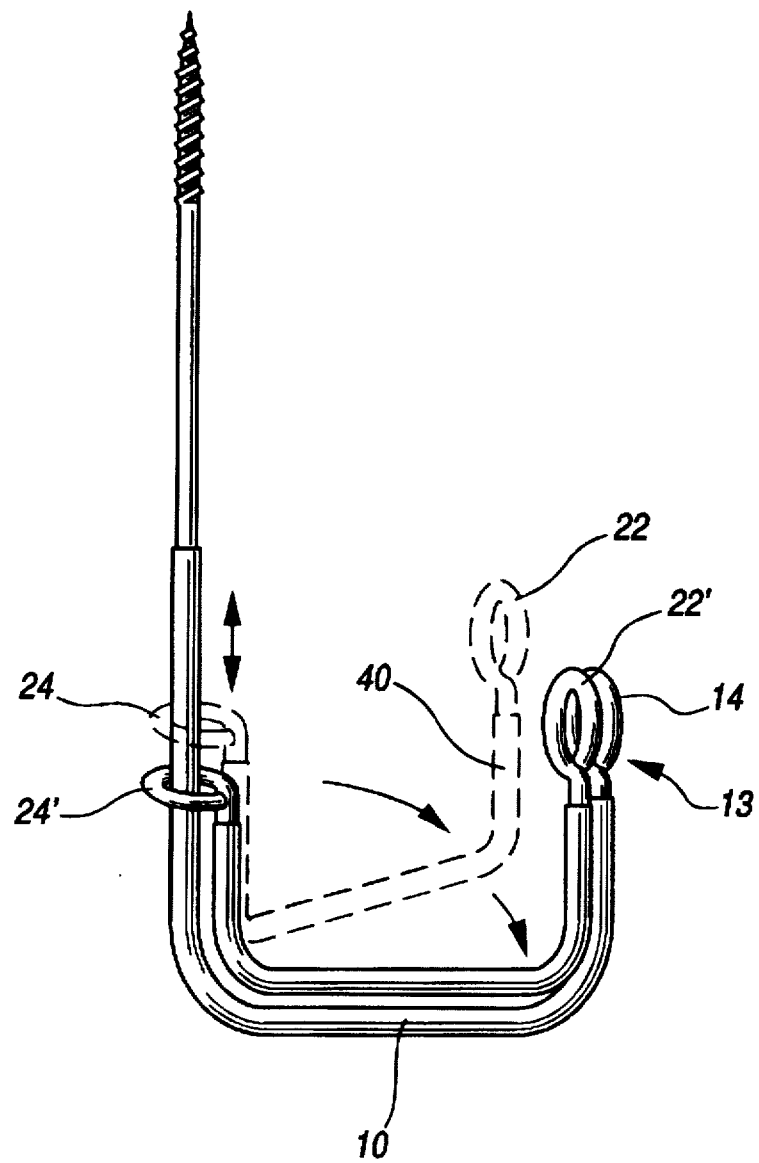
FIG. 4 is a perspective view of J shaped storage hook with a flat base and curved locking bar to secure merchandise.

In FIG. 4. it is apparent that through the use of the curved locking bar 40, the curved locking bar 40 can be positioned close to the J shaped storage hook 10'. This will hold down or immobilize hung objects and is an additional advantage of the present invention. When objects need to be unlocked then the padlock is removed and the curved locking bar is moved away from the J shaped storage hook 10.

The curved locking bar 40 is comprised of a bar with an eyebolt on either end. The front part of the locking bar 20 or front eyelet 22 fits over and is secured snugly below the closed eyelet 14 on the hook head end 13. The curved locking bar 40 allows the locking bar to be positioned near the J shaped storage hook 10.

The invention claims as follows:

1. A storage device for locking an object to a support against unauthorized removal of said object from said support comprising, in combination, a J-shaped member having a substantially elongated straight rigid leg and a U-Shaped bight portion having a first leg integral with a first end portion of the rigid leg, an attachment mechanism at a second end portion of the rigid leg for attaching the storage device to the support, a coupling member attached to an end portion of a second leg of the U-Shaped bight portion, and a locking bar having a first slidably engaging member at a first end thereof, the first slidably engaging member of the locking bar adapted to receive the coupling member of the U-Shaped bight portion, the first slidably engaging member of the locking bar slidably engaging the second leg of the U-Shaped bight portion, a second slidably engaging member at a second end of the locking bar, the second slidably engaging member of the locking bar slidably engaging the rigid leg, whereby the second slidably engaging member of the locking bar is slidably adjustable on the rigid leg and the first slidable engaging member of the locking bar is slidably adjustable on the second leg of the U-Shaped bight portion when a lock is secured to the coupling member.

2. A storage device as claimed in claim 11, wherein the coupling member at the end portion of the U-Shaped bight portion comprises an eyelet, the first slidably engaging member comprises a first eyelet, and the second slidably engaging member comprises a second eyelet.

3. A storage device as claimed in claim 1, including a locking mechanism connected to the coupling member of the U-Shaped bight portion whereby the locking mechanism prevents the first slidably engaging member of the locking bar from sliding over the coupling member of the U-Shaped bight portion.

4. A storage device as claimed in claim 3, wherein the coupling member comprises an eyelet, the first slidably engaging member comprises a first eyelet, and the second slidably engaging member comprises a second eyelet.

5. A storage device as claimed in claim 4, wherein the locking mechanism comprises a padlock.

6. A storage device for locking an object to a support against unauthorized removal of said object from said support comprising, in combination, a J-shaped member having a substantially elongated straight rigid leg and a U-Shaped bight portion having a first leg integral with a first end portion of the rigid leg, an attachment mechanism at a second end portion of the rigid leg for attaching the storage device to the support, an eyelet attached to an end portion of a second leg of the U-Shaped bight portion, a locking bar having a first eyelet at a first end thereof, the first eyelet of the locking bar adapted to receive the eyelet of the U-Shaped bight portion, the first eyelet of the locking bar slidably engaging the second leg of the U-Shaped bight portion, a second eyelet at a second end of the locking bar, the second eyelet of the locking bar slidably engaging the rigid leg, and a padlock engaging the eyelet of the U-Shaped bight portion whereby the padlock prevents the first eyelet of the locking bar from sliding over the eyelet of the U-Shaped bight portion, and the second eyelet of the locking bar is slidably adjustable on the rigid leg and the first eyelet of the locking bar is slidably adjustable on the second leg of the bight when the padlock is secured to the eyelet of the U-Shaped bight portion.

* * * * *